United States Patent
Tian et al.

(10) Patent No.: US 10,565,423 B2
(45) Date of Patent: Feb. 18, 2020

(54) DETECTION METHOD AND DEVICE USED IN FINGERPRINT IDENTIFICATION SYSTEM

(71) Applicant: Chipone Technology (Beijing) Co., Ltd., Beijing (CN)

(72) Inventors: Zhimin Tian, Beijing (CN); Changhai Wang, Beijing (CN)

(73) Assignee: Chipons Technology (Beijing) Co., Ltd. (CN)

( * ) Notice: Subject to any disclaimer, the term of this patent is extended or adjusted under 35 U.S.C. 154(b) by 0 days.

(21) Appl. No.: 15/877,014

(22) Filed: Jan. 22, 2018

(65) Prior Publication Data

US 2019/0095680 A1 Mar. 28, 2019

(30) Foreign Application Priority Data

Sep. 26, 2017 (CN) .......................... 2017 1 0884758

(51) Int. Cl.
*G06K 9/00* (2006.01)
*G06T 3/40* (2006.01)

(52) U.S. Cl.
CPC ........ *G06K 9/00026* (2013.01); *G06T 3/4038* (2013.01)

(58) Field of Classification Search
CPC ...... G06F 21/32; G06F 1/325; G06F 3/04883; G06F 9/445; G06K 9/0002; G06K 9/0008; G06K 9/00087; G06K 9/00006; G06K 9/00026; G02B 6/0088; G09G 3/3233; H01L 27/3225; G06T 3/4038
See application file for complete search history.

(56) References Cited

U.S. PATENT DOCUMENTS

| | | | |
|---|---|---|---|
| 7,606,399 B2* | 10/2009 | Morimura | A61B 5/1172 340/5.83 |
| 8,314,779 B2* | 11/2012 | Chan | G06F 3/044 345/174 |
| 8,564,314 B2* | 10/2013 | Shaikh | G06K 9/0002 324/658 |
| 9,151,790 B1* | 10/2015 | Hoshtanar | G01D 5/24 |

(Continued)

FOREIGN PATENT DOCUMENTS

| CN | 205302320 U | 6/2016 |
|---|---|---|
| CN | 205750806 U | 11/2016 |

*Primary Examiner* — Amir Alavi
(74) *Attorney, Agent, or Firm* — JW Law Group; James M. Wu (57) ABSTRACT

Disclosed a detection method used in a fingerprint identification system, the fingerprint identification system includes an array composed of a plurality of sensing electrodes configured to obtain a detection signal of a fingerprint, the detection method comprises: dividing the array into a plurality of regions; obtaining detection signals region by region; obtaining a noise signal from at least one of the plurality of sensing electrodes adjacent to at least one of the plurality of regions; and adjusting at least one of the detection signals by using the noise signal. The present disclosure also disclosed a detection device used in the fingerprint identification system. The disclosure can improve the quality of the image acquired by collecting the fingerprint and solve the problem that the image quality of the fingerprint identification system is deteriorated due to the common mode interference of the power supply.

13 Claims, 6 Drawing Sheets

(56) References Cited

U.S. PATENT DOCUMENTS

| | | | | |
|---|---|---|---|---|
| 9,158,958 B2* | 10/2015 | Wickboldt | ......... | G06K 9/00026 |
| 9,322,794 B2* | 4/2016 | Setlak | .................... | G01N 27/02 |
| 9,542,589 B2* | 1/2017 | Thammasouk | .... | G06K 9/00026 |
| 2006/0133655 A1* | 6/2006 | Cheng | ................ | G06K 9/00013 |
| | | | | 382/124 |
| 2016/0034741 A1* | 2/2016 | Lan | ......................... | G06K 9/00 |
| | | | | 382/124 |
| 2016/0283771 A1* | 9/2016 | Riedijk | ................... | G06F 3/044 |
| 2017/0004343 A1* | 1/2017 | Xie | ....................... | G06F 3/0416 |
| 2017/0061108 A1* | 3/2017 | Kwon | .................... | G06F 21/32 |
| 2017/0344783 A1* | 11/2017 | Zhang | ................ | G06F 3/04883 |
| 2018/0089491 A1* | 3/2018 | Kim | ..................... | G06F 3/0412 |

* cited by examiner

| P(0,0) | P(0,1) | P(0,2) | P(0,3) | P(0,4) | P(0,5) | P(0,6) | P(0,7) | P(0,8) | P(0,9) | P(0,10) | P(0,11) |
|---|---|---|---|---|---|---|---|---|---|---|---|
| P(1,0) | P(1,1) | P(1,2) | P(1,3) | P(1,4) | P(1,5) | P(1,6) | P(1,7) | P(1,8) | P(1,9) | P(1,10) | P(1,11) |
| P(2,0) | P(2,1) | P(2,2) | P(2,3) | P(2,4) | P(2,5) | P(2,6) | P(2,7) | P(2,8) | P(2,9) | P(2,10) | P(2,11) |
| P(3,0) | P(3,1) | P(3,2) | P(3,3) | P(3,4) | P(3,5) | P(3,6) | P(3,7) | P(3,8) | P(3,9) | P(3,10) | P(3,11) |
| P(4,0) | P(4,1) | P(4,2) | P(4,3) | P(4,4) | P(4,5) | P(4,6) | P(4,7) | P(4,8) | P(4,9) | P(4,10) | P(4,11) |
| P(5,0) | P(5,1) | P(5,2) | P(5,3) | P(5,4) | P(5,5) | P(5,6) | P(5,7) | P(5,8) | P(5,9) | P(5,10) | P(5,11) |
| P(6,0) | P(6,1) | P(6,2) | P(6,3) | P(6,4) | P(6,5) | P(6,6) | P(6,7) | P(6,8) | P(6,9) | P(6,10) | P(6,11) |
| P(7,0) | P(7,1) | P(7,2) | P(7,3) | P(7,4) | P(7,5) | P(7,6) | P(7,7) | P(7,8) | P(7,9) | P(7,10) | P(7,11) |
| P(8,0) | P(8,1) | P(8,2) | P(8,3) | P(8,4) | P(8,5) | P(8,6) | P(8,7) | P(8,8) | P(8,9) | P(8,10) | P(8,11) |
| P(9,0) | P(9,1) | P(9,2) | P(9,3) | P(9,4) | P(9,5) | P(9,6) | P(9,7) | P(9,8) | P(9,9) | P(9,10) | P(9,11) |
| P(10,0) | P(10,1) | P(10,2) | P(10,3) | P(10,4) | P(10,5) | P(10,6) | P(10,7) | P(10,8) | P(10,9) | P(10,10) | P(10,11) |
| P(11,0) | P(11,1) | P(11,2) | P(11,3) | P(11,4) | P(11,5) | P(11,6) | P(11,7) | P(11,8) | P(11,9) | P(11,10) | P(11,11) |

FIG.3a

| P(0,0) | P(0,1) | P(0,2) | P(0,3) | P(0,4) | P(0,5) | P(0,6) | P(0,7) | P(0,8) | P(0,9) | P(0,10) | P(0,11) |
|---|---|---|---|---|---|---|---|---|---|---|---|
| P(1,0) | P(1,1) | P(1,2) | P(1,3) | P(1,4) | P(1,5) | P(1,6) | P(1,7) | P(1,8) | P(1,9) | P(1,10) | P(1,11) |
| P(2,0) | P(2,1) | P(2,2) | P(2,3) | P(2,4) | P(2,5) | P(2,6) | P(2,7) | P(2,8) | P(2,9) | P(2,10) | P(2,11) |
| P(3,0) | P(3,1) | P(3,2) | P(3,3) | P(3,4) | P(3,5) | P(3,6) | P(3,7) | P(3,8) | P(3,9) | P(3,10) | P(3,11) |
| P(4,0) | P(4,1) | P(4,2) | P(4,3) | P(4,4) | P(4,5) | P(4,6) | P(4,7) | P(4,8) | P(4,9) | P(4,10) | P(4,11) |
| P(5,0) | P(5,1) | P(5,2) | P(5,3) | P(5,4) | P(5,5) | P(5,6) | P(5,7) | P(5,8) | P(5,9) | P(5,10) | P(5,11) |
| P(6,0) | P(6,1) | P(6,2) | P(6,3) | P(6,4) | P(6,5) | P(6,6) | P(6,7) | P(6,8) | P(6,9) | P(6,10) | P(6,11) |
| P(7,0) | P(7,1) | P(7,2) | P(7,3) | P(7,4) | P(7,5) | P(7,6) | P(7,7) | P(7,8) | P(7,9) | P(7,10) | P(7,11) |
| P(8,0) | P(8,1) | P(8,2) | P(8,3) | P(8,4) | P(8,5) | P(8,6) | P(8,7) | P(8,8) | P(8,9) | P(8,10) | P(8,11) |
| P(9,0) | P(9,1) | P(9,2) | P(9,3) | P(9,4) | P(9,5) | P(9,6) | P(9,7) | P(9,8) | P(9,9) | P(9,10) | P(9,11) |
| P(10,0) | P(10,1) | P(10,2) | P(10,3) | P(10,4) | P(10,5) | P(10,6) | P(10,7) | P(10,8) | P(10,9) | P(10,10) | P(10,11) |
| P(11,0) | P(11,1) | P(11,2) | P(11,3) | P(11,4) | P(11,5) | P(11,6) | P(11,7) | P(11,8) | P(11,9) | P(11,10) | P(11,11) |

FIG.3b

| P(0,0) | P(0,1) | P(0,2) | P(0,3) | P(0,4) | P(0,5) | P(0,6) | P(0,7) | P(0,8) | P(0,9) | P(0,10) | P(0,11) |
|---|---|---|---|---|---|---|---|---|---|---|---|
| P(1,0) | P(1,1) | P(1,2) | P(1,3) | P(1,4) | P(1,5) | P(1,6) | P(1,7) | P(1,8) | P(1,9) | P(1,10) | P(1,11) |
| P(2,0) | P(2,1) | P(2,2) | P(2,3) | P(2,4) | P(2,5) | P(2,6) | P(2,7) | P(2,8) | P(2,9) | P(2,10) | P(2,11) |
| P(3,0) | P(3,1) | P(3,2) | P(3,3) | P(3,4) | P(3,5) | P(3,6) | P(3,7) | P(3,8) | P(3,9) | P(3,10) | P(3,11) |
| P(4,0) | P(4,1) | P(4,2) | P(4,3) | P(4,4) | P(4,5) | P(4,6) | P(4,7) | P(4,8) | P(4,9) | P(4,10) | P(4,11) |
| P(5,0) | P(5,1) | P(5,2) | P(5,3) | P(5,4) | P(5,5) | P(5,6) | P(5,7) | P(5,8) | P(5,9) | P(5,10) | P(5,11) |
| P(6,0) | P(6,1) | P(6,2) | P(6,3) | P(6,4) | P(6,5) | P(6,6) | P(6,7) | P(6,8) | P(6,9) | P(6,10) | P(6,11) |
| P(7,0) | P(7,1) | P(7,2) | P(7,3) | P(7,4) | P(7,5) | P(7,6) | P(7,7) | P(7,8) | P(7,9) | P(7,10) | P(7,11) |
| P(8,0) | P(8,1) | P(8,2) | P(8,3) | P(8,4) | P(8,5) | P(8,6) | P(8,7) | P(8,8) | P(8,9) | P(8,10) | P(8,11) |
| P(9,0) | P(9,1) | P(9,2) | P(9,3) | P(9,4) | P(9,5) | P(9,6) | P(9,7) | P(9,8) | P(9,9) | P(9,10) | P(9,11) |
| P(10,0) | P(10,1) | P(10,2) | P(10,3) | P(10,4) | P(10,5) | P(10,6) | P(10,7) | P(10,8) | P(10,9) | P(10,10) | P(10,11) |
| P(11,0) | P(11,1) | P(11,2) | P(11,3) | P(11,4) | P(11,5) | P(11,6) | P(11,7) | P(11,8) | P(11,9) | P(11,10) | P(11,11) |

DETECTION METHOD AND DEVICE USED IN FINGERPRINT IDENTIFICATION SYSTEM

CROSS-REFERENCE TO RELATED APPLICATION

This application claims the benefit of Chinese Patent Application No. 201710884758X, filed on Sep. 26, 2017, which is incorporated herein by reference in its entirety.

BACKGROUND OF THE DISCLOSURE

Field of the Disclosure

The present disclosure relates to the field of fingerprint identification, and more particularly, to a detection method and a detection device used in a fingerprint identification system.

Background of the Disclosure

Fingerprint patterns are differ from person to person and thus fingerprints are widely used in the field of personal identification. In particular, fingerprint identification, as a means of personal authentication, is widely used in various fields including finance, criminal investigation, security, and so on.

Further, a fingerprint sensor has been developed to identify individuals by identifying the fingerprint. The fingerprint sensor is a device that identifies a finger's fingerprint when the finger contacts the fingerprint sensor and can be used to determine whether a person is a legitimate user or not.

Various identification modes such as optical mode, thermal sensing mode and capacitive mode are known to be used for implementing the fingerprint sensor. The fingerprint sensor operated in capacitive mode acquires the pattern of a fingerprint (fingerprint pattern) by detecting capacitive changes based on valley and ridge lines of the fingerprint, when the surface of a human finger contacts the conductive sensor pattern of the fingerprint sensor.

Recently, a portable device provides not only communication functions such as calling and sending short message, but also a variety of addition functions on the aspects of using personal information such as finance, security and so on. Accordingly, a necessity of a locking device for the portable device becomes quite important. The kind of portable devices equipped with locking devices including fingerprint sensors have been vigorously developed so that the locking effect of the portable devices is improved.

Currently, a low-voltage DC power supply is generally used to supply power to the fingerprint sensor, and thus, a charging circuit is essential. However, different charging management chips and different charger devices generate different common mode noises, and these common mode noises will be transferred to the fingerprint sensor if they cannot be effectively suppressed, thereby blurring the acquired fingerprint images and further influencing the identification effect.

Figure 1:
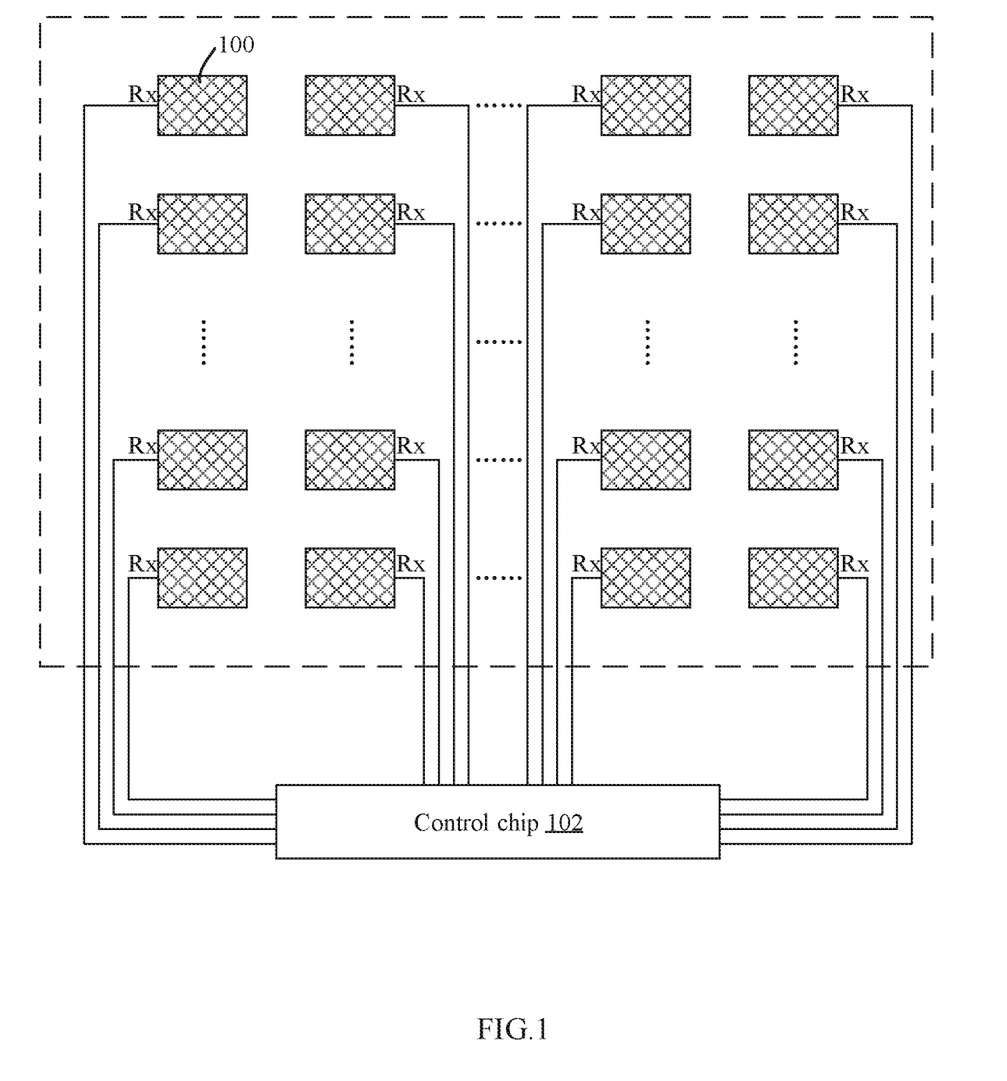
FIG. 1 is a structural diagram of a conventional fingerprint identification system.

FIG. 1 is a structural diagram of a conventional fingerprint identification system. As shown in FIG. 1, a fingerprint sensor includes an array composed of a plurality of sensing electrodes. Each sensing electrode 100 is connected with a sensing wire which transfers the fingerprint information acquired by the sensing electrode 100 to a control chip 102.

However, the control chip 102 has a limited processing capability, so that it generally reuses one or more analog-to-digital converters ADC in time-sharing mode for image acquisition. The common mode noises also vary with time such that the final acquired fingerprint image is superposed by the common mode noises, and thus, the identification effect is influenced.

SUMMARY OF THE DISCLOSURE

An objective of the disclosure is to provide a detection method and a detection device used in a fingerprint identification system, to solve the problem that the image quality of the fingerprint identification system is deteriorated due to the common mode interference of the power supply.

According to one aspect of the disclosure, there is provided a detection method used in a fingerprint identification system, the fingerprint identification system includes an array composed of a plurality of sensing electrodes configured to obtain detection signals of a fingerprint, the detection method comprises: dividing the array into a plurality of regions; obtaining detection signals region by region; obtaining a noise signal from at least one of the plurality of sensing electrodes adjacent to at least one of the plurality of regions; and adjusting at least one of the detection signals by using the noise signal.

Preferably, the array is divided by row, by column or by block to obtain the plurality of regions.

Preferably, the detection method further comprises: providing scanning signals region by region during a plurality of scanning periods.

Preferably, one of the plurality of scanning periods comprises a plurality of scanning sub-periods, at least one region of the plurality of regions is scanned during each of the plurality of scanning sub-periods.

Preferably, when the detection signals are adjusted during a current scanning sub-period, the noise signal is from a previous scanning sub-period of the current scanning sub-period, or from a next scanning sub-period of the current scanning sub-period, or from a previous scanning period.

Preferably, said at least one of sensing electrodes adjacent to at least one of the plurality of regions comprises at least one of sensing electrodes adjacent to a region selected from among the plurality of regions.

According to the other aspect of the disclosure, there is provided A detection device used in a fingerprint identification system which comprises an array composed of a plurality of sensing electrodes configured to obtain detection signals of a fingerprint, comprising: a division module configured to divide the array into a plurality of regions; a first obtaining module configured to obtain detection signals region by region; a second obtaining module configured to obtain a noise signal from at least one of the plurality of sensing electrodes adjacent to at least one of the plurality of regions; and an adjusting module configured to adjust at least one of the detection signals by using the noise signal.

Preferably, the division module is configured to divide the array by row, by column or by block to obtain the plurality of regions.

Preferably, the detection device further comprises: a scanning module configured to provide scanning signals region by region during a plurality of scanning periods.

Preferably, each of the plurality of scanning periods comprises a plurality of scanning sub-periods, and at least one region of the plurality of regions is scanned during each scanning sub-period.

Preferably, when the detection signals are adjusted during a current scanning sub-period, the noise signal is from a previous scanning sub-period of the current scanning sub-period, or from a next scanning sub-period of the current scanning sub-period, or from a previous scanning period.

Preferably, said at least one of sensing electrodes adjacent to at least one of the plurality of regions comprises at least one of sensing electrodes adjacent to a region selected from among the plurality of regions.

According to the disclosure, the detection method and device used in the fingerprint identification system divide an array into a plurality of regions, obtain detection signals region by region, obtain a noise signal from at least one sensing electrode adjacent to at least one of the plurality of regions, adjust the detection signals by using the obtained noise signal, so that, the quality of the image acquired by collecting fingerprints is improved and the problem that the image quality of the fingerprint identification system is deteriorated due to the common mode interference of the power supply.

BRIEF DESCRIPTION OF THE DRAWINGS

The above and other objects, advantages and features of the present invention will become more fully understood from the detailed description given hereinbelow in connection with the appended drawings, and wherein:

FIGS. 3*a* to 3*c* are schematic diagrams showing that an array is divided into a plurality of regions according to an embodiment of the disclosure.

DETAILED DESCRIPTION OF THE DISCLOSURE

Exemplary embodiments of the present disclosure will be described in more details below with reference to the accompanying drawings. In the drawings, like reference numerals denote like members. The figures are not drawn to scale, for the sake of clarity.

The disclosure can be embodied in various forms, some of which will be described below. The term "comprising" used in the specification and claims is an open term and should be construed as "including but not limited to".

Figure 2:
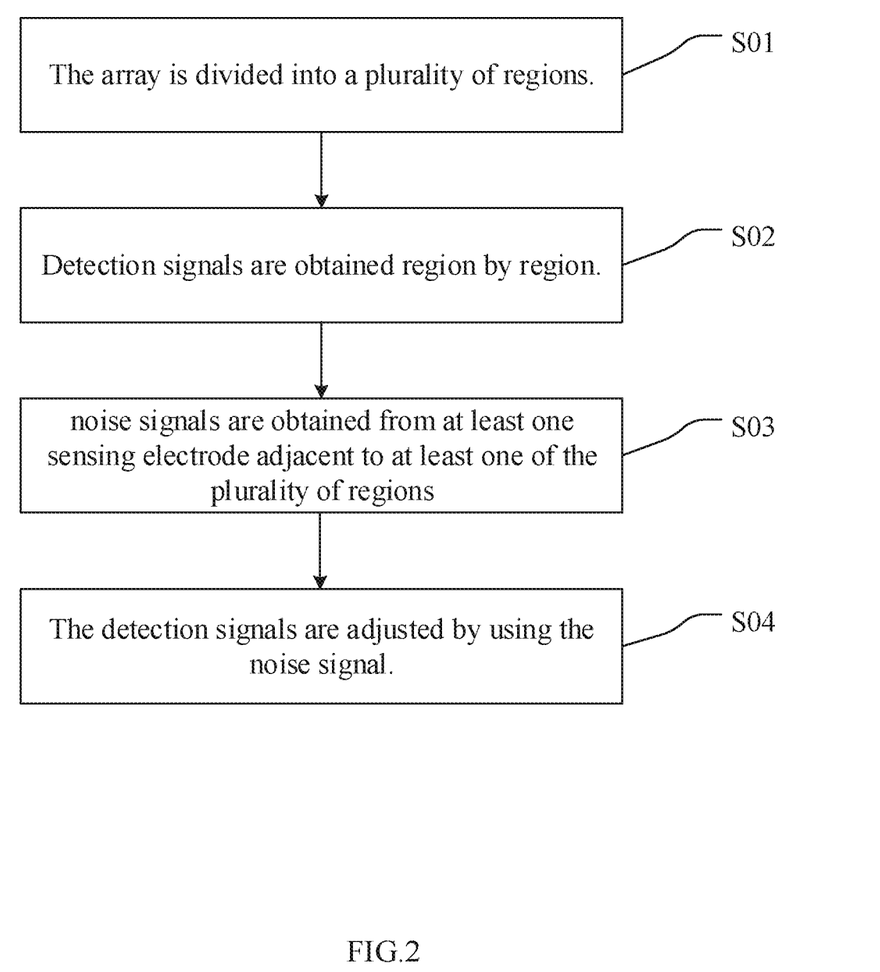
FIG. 2 is a flow diagram of a detection method used in a fingerprint identification system according to an embodiment of the disclosure.

FIG. 2 is a flow diagram of a detection method used in a fingerprint identification system according to an embodiment of the disclosure. The fingerprint identification system includes at least one two-dimensional array composed of M*N sensing electrodes, M and N are both integers greater than 1. The plurality of sensing electrodes is used to obtain detection signals corresponding to a fingerprint. As shown in FIG. 2, the detection method used in the fingerprint identification system includes following steps.

At step S01, the array is divided into a plurality of regions.

In the embodiment, the array is divided by row, by column or by block to obtain the plurality of regions.

Specifically, each region includes an array composed of S*T sensing electrodes, S and T are positive integers, and the following equations are satisfied, M=a*S, N=b*T, a and b are both positive integers. When S=1, the array is divided by row to obtain a plurality of row regions. When T=1, the array is divided by column to obtain a plurality of column regions. When S>1 and T>1, the array is divided by block to obtain a plurality of block regions.

Figure 3A:
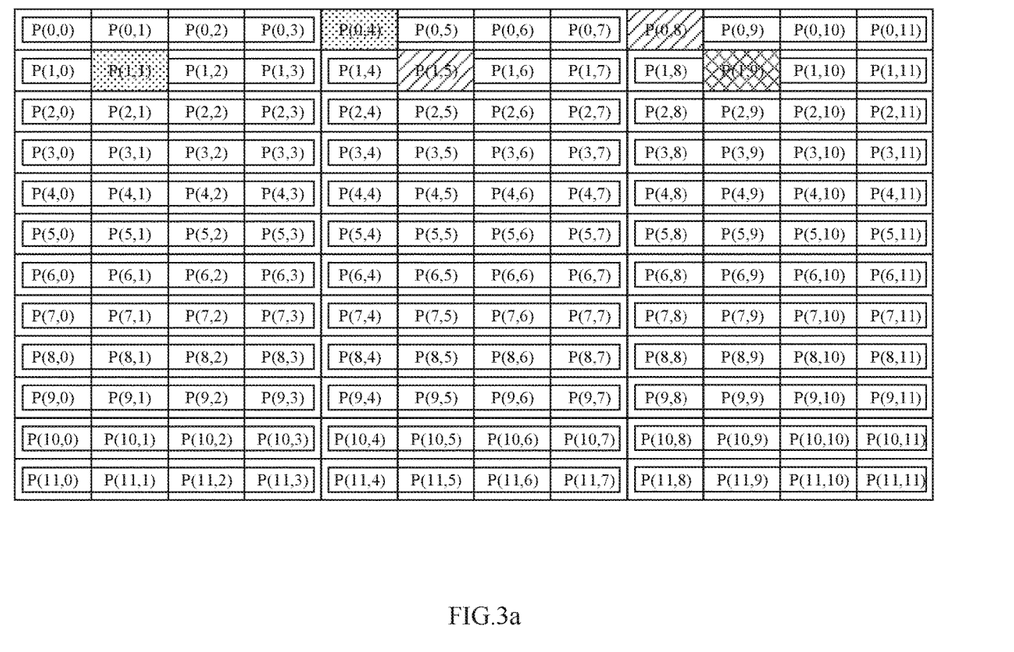
Figure 3B:
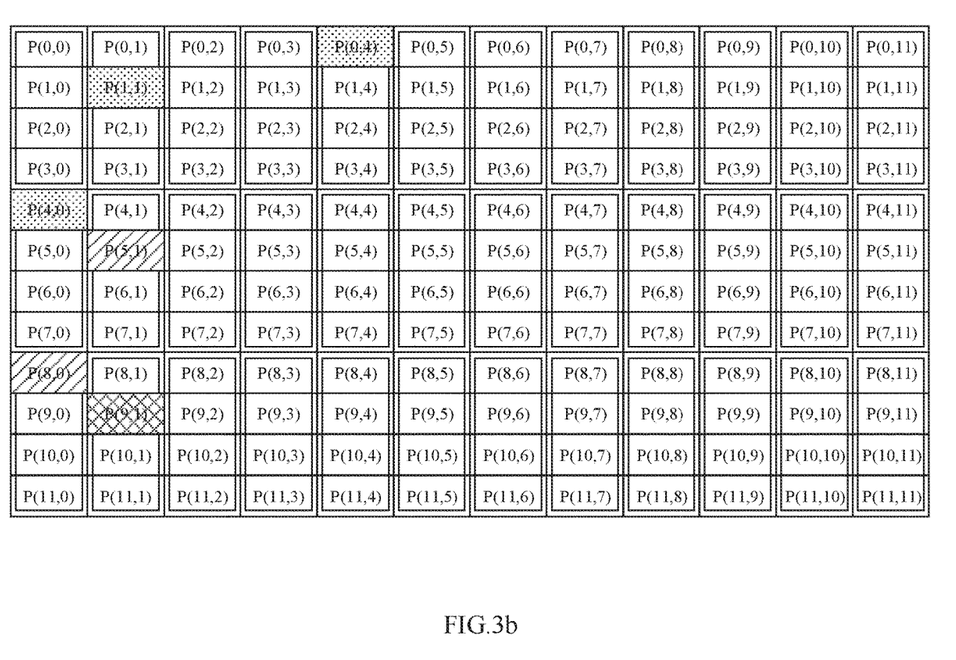
Figure 3C:
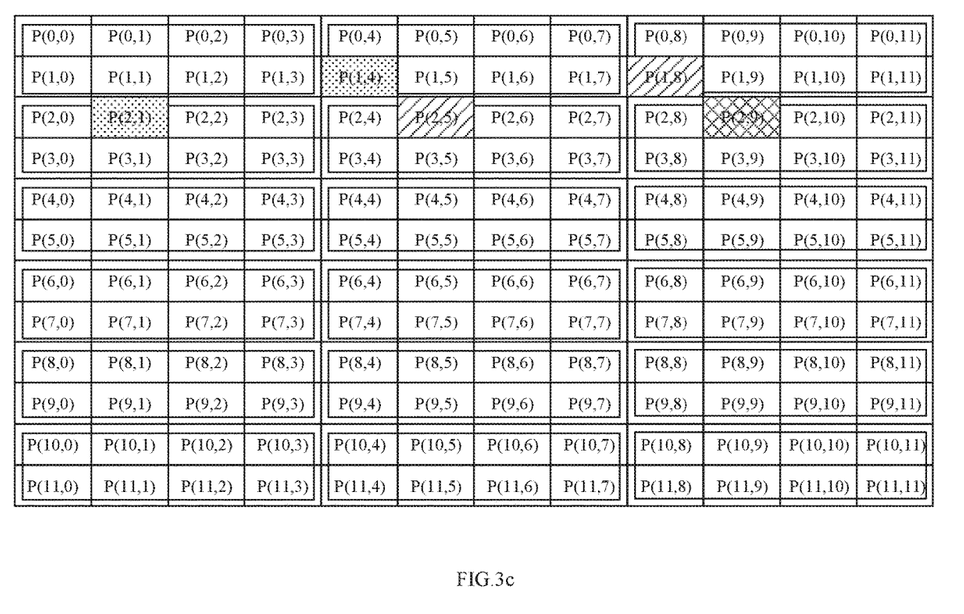

FIGS. 3*a* to 3*c* are schematic diagrams showing that an array is divided into a plurality of regions according to an embodiment of the disclosure. As shown in FIG. 3*a*, as an example, each row region is composed of 4 sensing electrodes. As shown in FIG. 3*b*, as an example, each column region is composed of 4 sensing electrodes. As shown in FIG. 3*c*, as an example, each block region is a 2*4 array composed of 8 sensing electrodes.

At step S02, detection signals are obtained region by region.

In the embodiment, the plurality of regions are scanned region by region, and the detection signals corresponding to a fingerprint are obtained from the sensing electrodes in each region.

Specifically, during a plurality of scanning periods, scanning signals are provided region by region to obtain the detection signals. Each scanning period includes a plurality of scanning sub-periods, and during each scanning sub-period, at least one region of the plurality of regions is scanned.

Here, row regions are taken as an example, wherein during each scanning period, the scanning signals are provided one by one to a plurality of row regions in one row. During each scanning sub-period, at least one row region of the plurality of row regions in one row is scanned.

Here, column regions are taken as an example, wherein during each scanning period, the scanning signals are provided one by one to a plurality of column regions in one column. During each scanning sub-period, at least one column region of the plurality of column regions in one column is scanned.

Here, block regions are taken as an example, wherein during each scanning period, the scanning signals are provided one by one to block regions in one row or in one column. During each scanning sub-period, at least one block region of the plurality of block regions in one row or in one column is scanned.

At step S03, noise signals are obtained from at least one sensing electrode adjacent to at least one of the plurality of regions.

In the embodiment, while a region selected among the plurality of regions is under scanning to obtain detection signals, noise signals are obtained from at least one sensing electrode adjacent to the selected region.

In the embodiment, the at least one sensing electrode adjacent to the selected region is one or more sensing electrodes which located at any position adjacent to the selected region. For example, the at least one sensing electrode adjacent to the selected region is located at the left side of the selected region, at the right side of the selected region, above the selected region, or below the selected region.

In a preferable embodiment, the fingerprint identification system includes a three-dimensional array composed of a plurality of two-dimensional array, each of the plurality of two-dimensional arrays is composed of M*N sensing electrodes. The at least one sensing electrode adjacent to the selected region is referred to as the sensing electrodes which locate at the left array, the right array, the upper array, and the lower array of the selected region.

At step S04, the detection signals are adjusted by using the noise signals.

In the embodiment, when the detection signals are adjusted during a current scanning sub-period, the noise signals are from a previous scanning sub-period of the current scanning sub-period, or from a next scanning sub-period of the current scanning sub-period, or from a previous scanning period.

As shown in FIG. 3a, as an example, the fingerprint identification system includes an array composed of 12*12 sensing electrodes, each sensing electrode is represented by a coordinate (i, j), i and j are both natural numbers. The array is divided into row regions, each row region includes 4 sensing electrodes, and scanning the array needs 12 scanning periods, each scanning period includes 3 scanning sub-periods. The at least one sensing electrodes adjacent to the selected region are the sensing electrodes located at the right and lower positions of the corresponding region.

At a first scanning period, the scanning signals are provided to three row regions in a first row to obtain the detection signals. The first scanning period includes a first scanning sub-period to a third scanning sub-period.

During the first scanning sub-period, the sensing electrodes P(0, 0) to P(0, 3) in the first row region are scanned and the detection signals D(0, 0) to D(0, 3) are obtained, and at the same time, the noise signals are obtained from the sensing electrodes adjacent to the first row region. As an example, here the sensing electrodes adjacent to the first row region are the sensing electrode P(0,4) located at the right position of the first row region and the sensing electrode P(1,1) located at the lower position of the first row region, the corresponding noise signals are Dn(0,4) and Dn(1,1).

During the second scanning sub-period, the sensing electrodes P(0, 4) to P(0, 7) in the second row region are scanned and the detection signals D(0, 4) to D(0, 7) are obtained, and at the same time, the noise signals are obtained from the sensing electrodes adjacent to the second row region. As an example, here the sensing electrodes adjacent to the second row region are the sensing electrode P(0, 8) located at the right position of the second row region and the sensing electrode P(1, 5) located at the lower position of the second row region, the corresponding noise signals are Dn(0, 8) and Dn(1, 5).

In the third scanning sub-period, the sensing electrodes P(0, 8) to P(0, 11) in the third row region are scanned and the detection signals D(0, 8) to D(0, 11) are obtained, and at the same time, the noise signals are obtained from the sensing electrodes adjacent to the third row region. As an example, here the sensing electrode adjacent to the third row region is the sensing electrode P(1, 9) located at the lower position of the third row region, the corresponding noise signal is Dn(1, 9).

At a second scanning period, scanning signals are provided to three row regions in a second row to obtain the detection signals. The second scanning period includes a fourth scanning sub-period to a sixth scanning sub-period.

In the fourth scanning sub-period, the sensing electrodes P(1, 0) to P(1, 3) in the fourth row region are scanned and the detection signals D(1, 0) to D(1, 3) are obtained, and at the same time, the noise signals are obtained from the sensing electrodes adjacent to the fourth row region. As an example, here the sensing electrodes adjacent to the fourth row region are the sensing electrode P(1, 4) located at the right position of the fourth row region and the sensing electrode P(2, 1) located at the lower position of the fourth row region, the corresponding noise signals are Dn(1, 4) and Dn(2, 1).

In the fifth scanning sub-period, the sensing electrodes P(1, 4) to P(1, 7) in the fifth row region are scanned and the detection signals D(1, 4) to D(1, 7) are obtained, and at the same time, the noise signals are obtained from the sensing electrodes adjacent to the fifth row region. As an example, here the sensing electrodes adjacent to the fifth row region are the sensing electrode P(1, 8) located at the right position of the fifth row region and the sensing electrode P(2, 5) located at the lower position of the fifth row region, the corresponding noise signals are Dn(1, 8) and Dn(2, 5).

In the sixth scanning sub-period, the sensing electrodes P(1, 8) to P(1, 11) in the sixth row region are scanned and the detection signals D(1, 8) to D(1, 11) are obtained, and at the same time, the noise signals are obtained from the sensing electrodes adjacent to the sixth row region. As an example, here the sensing electrode adjacent to the sixth row region is the sensing electrode P(2, 9) located at the lower position of the sixth row region, the corresponding noise signal is Dn(2, 9).

By this way, the whole array is scanned, and then the detection signals are adjusted by using the noise signals.

The sensing electrode P(0, 4) is scanned repeatedly during the first scanning sub-period and the second scanning sub-period of the first scanning period, so that the noise difference $\Delta D(0, 4)$ between the second scanning sub-period and the first scanning sub-period is $Dn(0, 4)-D(0, 4)$, and the detection signals acquired during the second scanning sub-period are added to the noise difference $\Delta D(0, 4)$, respectively, to obtain the adjusted detection signals of the second scanning sub-period, that is, $D'(0, 4)=D(0, 4)+\Delta D(0, 4)$, $D'(0, 5)=D(0, 5)+\Delta D(0,4), \ldots, D'(0, 7)=D(0, 7)+\Delta D(0, 4)$.

To continue the adjustment of the detection signals, the noise signals acquired during the second scanning sub-period are also adjusted, that is, $Dn'(0, 8)=Dn(0, 8)+\Delta D(0, 8)$, $Dn'(1, 5)=Dn(1, 5)+\Delta D(0, 8)$.

The sensing electrode P(0, 8) is scanned repeatedly during the third scanning sub-period and the second scanning sub-period, so that the noise difference $\Delta D(0, 8)$ between the third scanning sub-period and the second scanning sub-period is $Dn'(0, 8)-D(0, 8)$, and the detection signals acquired during the third scanning sub-period are added to the noise difference $\Delta D(0, 8)$, respectively, to obtain the adjusted detection signals of the third scanning sub-period, that is, $D'(0, 8)=D(0, 8)+\Delta D(0, 8)$, $D'(0, 9)=D(0, 9)+\Delta D(0, 8), \ldots, D'(0, 11)=D(0, 11)+\Delta D(0, 8)$.

To continue the adjustment of the detection signals, the noise signal acquired during the third scanning sub-period is also adjusted, that is, $Dn'(1, 9)=Dn(1, 9)+\Delta D(0, 8)$.

The sensing electrode P(1, 1) is scanned repeatedly during the fourth scanning sub-period of the second scanning period and the first scanning period, so that the noise difference $\Delta D(1, 1)$ between the fourth scanning sub-period and the first scanning period is $Dn(1, 1)-D(1, 1)$, and the detection signals acquired during the fourth scanning sub-period are added to the noise difference $\Delta D(1, 1)$, respectively, to obtain the adjusted detection signals of the fourth scanning sub-period, that is, $D'(1, 0)=D(1, 0)+\Delta D(1, 1)$, $D'(1, 1)=D(1, 1)+\Delta D(1, 1), \ldots, D'(1, 3)=D(1, 3)+\Delta D(1, 1)$.

To continue the adjustment of the detection signals, the noise signals acquired during the fourth scanning sub-period are also adjusted, that is, $Dn'(1, 4)=Dn(1, 4)+\Delta D(1, 1)$, $Dn'(2, 1)=Dn(2, 1)+\Delta D(1, 1)$.

There are two sensing electrodes which are scanned repeatedly during the fifth scanning sub-period and all the previous scanning sub-periods of the fifth scanning sub-period, and the detection signals of the fifth scanning sub-period can be adjusted corresponding to either of the two sensing electrodes.

In one embodiment, the sensing electrode P(1, 7), which is scanned repeatedly during the fifth scanning sub-period and the first scanning period, is selected, so that the noise difference ΔD(1, 7) between the fifth scanning sub-period and the first scanning period is Dn'(1, 7)-D(1, 7), and the detection signals acquired during the fifth scanning sub-period are added to the noise difference ΔD(1, 7), respectively, to obtain the adjusted detection signals of the fifth scanning sub-period, that is, D'(1, 4)=D(1, 4)+ΔD(1, 7), D'(1, 5)=D(1, 5)+ΔD(1, 7), . . . , D'(1, 7)=D(1, 7)+ΔD(1, 7).

In another embodiment, the sensing electrode P(1, 4), which is scanned repeatedly during the fifth scanning sub-period and the fourth scanning sub-period, is selected, so that the noise difference ΔD(1, 4) between the fourth scanning sub-period and the first scanning period is Dn(1, 4)-D(1, 4), and the detection signals acquired during the fifth scanning sub-period are added to the noise difference ΔD(1, 4), respectively, to obtain the adjusted detection signals of the fifth scanning sub-period, that is, D'(1, 4)=D(1, 4)+ΔD(1, 4), D'(1, 5)=D(1, 5)+ΔD(1, 4), . . . , D'(1, 7)=D(1, 7)+ΔD(1, 4).

By repeating iterations, the adjusted detection signals of the whole array can be obtained.

According to the disclosure, the detection method used in the fingerprint identification system divides an array into a plurality of regions, obtains detection signals region by region, obtains noise signals from at least sensing electrode adjacent to at least one of the plurality of regions, adjusts the detection signals by using the obtained noise signals, so that, the quality of the acquired fingerprint images is improved and the problem that the quality of the images degrades due to the interferences of the common noise of the power source is solved.

Figure 4:
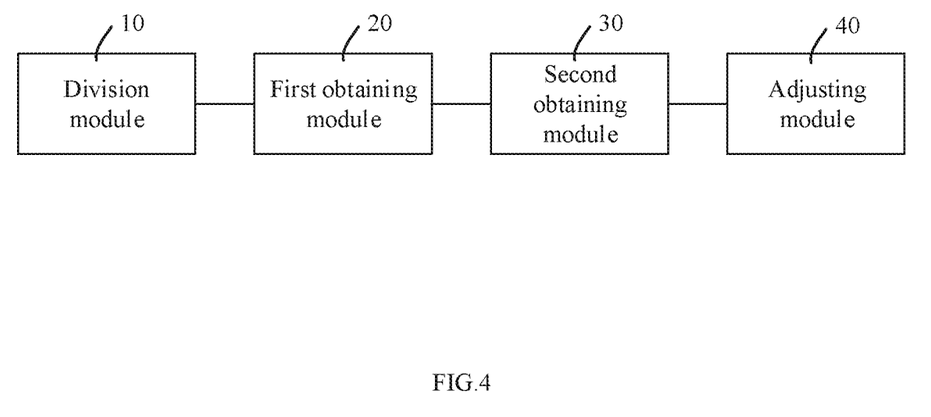
FIG. 4 is a structural diagram of a detection device used in a fingerprint identification system according to an embodiment of the disclosure.

FIG. 4 is a structural diagram of a detection device used in a fingerprint identification system according to an embodiment of the disclosure. The fingerprint identification system includes at least one two-dimensional array composed of M*N sensing electrodes, M and N are both integers greater than 1. The plurality of sensing electrodes are used to obtain detection signals corresponding to a fingerprint. As shown in FIG. 4, the detection device used in the fingerprint identification system includes a division module 10, a first obtaining module 20, a second obtaining module 30 and an adjusting module 40.

The division module 10 divides the array into a plurality of regions.

In the embodiment, the array is divided by row, by column or by block to obtain the plurality of regions.

Specifically, each region includes an array composed of S*T sensing electrodes, S and T are positive integers, and the following equation is satisfied, M=a*S, N=b*T, a and b are both positive integers. When S=1, the array is divided into a plurality of row regions. When T=1, the array is divided into a plurality of column regions. When S>1 and T>1, the array is divided into a plurality of block regions.

FIGS. 3a to 3c are schematic diagrams showing that an array is divided into a plurality of regions according to an embodiment of the disclosure. As shown in FIG. 3a, as an example, each row region is composed of 4 sensing electrodes. As shown in FIG. 3b, as an example, each column region is composed of 4 sensing electrodes. As shown in FIG. 3c, as an example, each block region is a 2*4 array composed of 8 sensing electrodes.

The first obtaining module 20 obtains detection signals region by region.

In the embodiment, the first obtaining module 20 includes a plurality of analog-to-digital converters ADC, the number of the sensing electrodes in each region is equal to the number of the analog-to-digital converters ADC in the first obtaining module 20. The first obtaining module 20 scans the plurality of regions region by region, and obtains the detection signals corresponding to a fingerprint from the sensing electrodes in each region.

Specifically, during a plurality of scanning periods, scanning signals are provided region by region to obtain the detection signals. Each scanning period includes a plurality of scanning sub-periods, and during each scanning sub-period, at least one region of the plurality of regions is scanned.

Here, row regions are taken as an example, wherein during each scanning period, the scanning signals are provided one by one to a plurality of row regions in one row. During each scanning sub-period, at least one row region of the plurality of row regions is scanned.

Here, column regions are taken as an example, wherein during each scanning period, the scanning signals are provided one by one to a plurality of column regions in one column. During each scanning sub-period, at least one column region of the plurality of column regions is scanned.

Here, block regions are taken as an example, wherein during each scanning period, the scanning signals are provided one by one to the block regions in one row or in one column. During each scanning sub-period, at least one block region of the plurality of block regions in one row or in one column is scanned.

The second obtaining module 30 obtains noise signals from at least one sensing electrodes adjacent to at least one of the plurality of regions.

In the embodiment, while a region selected from the region is scanned to obtain detection signals, noise signals are obtained from at least one sensing electrode adjacent to the selected region.

In the embodiment, the at least one sensing electrode adjacent to the selected region is the sensing electrodes located at any position adjacent to the selected region. For example, at least one sensing electrode adjacent to the selected region is located at the left of the selected region, the right of the selected region, above the selected region, below the selected region.

In a preferable embodiment, the fingerprint identification system includes a three-dimensional array composed of a plurality of two-dimensional array, each of the plurality of two-dimensional array is composed of M*N sensing electrodes. The at least one sensing electrode adjacent to the selected region is referred to as the sensing electrodes locates at the left array, the right array, the upper array, or the lower array of the selected region.

The second obtaining module 30 includes a plurality of analog-to-digital converters ADC, the number of the sensing electrodes adjacent to the selected region is equal to the number of the analog-to-digital converters ADC in the second obtaining module 30.

The adjusting module 40 adjusts the detection signals by using the noise signals.

In the embodiment, when the detection signals are adjusted during a current scanning sub-period, the noise signals are from a previous scanning sub-period of the current scanning sub-period, or from a next scanning sub-period of the current scanning sub-period, or from a previous scanning period.

As shown in FIG. 3a, as an example, the fingerprint identification system includes an array composed of 12*12 sensing electrodes, each sensing electrode is represented by a coordinate (i, j), i and j are both natural numbers. The array is divided into row regions, each row region includes 4 sensing electrodes, and scanning the array needs 12 scanning periods, each scanning period includes 3 scanning sub-periods. The sensing electrodes adjacent to the selected region are the sensing electrodes located at the right and lower positions of the corresponding region.

At a first scanning period, the scanning signals are provided to three row regions in a first row to obtain the detection signals. The first scanning period includes a first scanning sub-period to a third scanning sub-period.

In the first scanning sub-period, the sensing electrodes P(0, 0) to P(0, 3) in the first row region are scanned and the detection signals D(0, 0) to D(0, 3) are obtained, and at the same time, the noise signals are obtained from the sensing electrodes adjacent to the first row region. As an example, here the sensing electrodes adjacent to the first row region are the sensing electrode P(0, 4) located at the right position of the first row region and the sensing electrode P(1, 1) located at the lower position of the first row region, the corresponding noise signals are Dn(0, 4) and Dn(1, 1).

In the second scanning sub-period, the sensing electrodes P(0, 4) to P(0, 7) in the second row region are scanned and the detection signals D(0, 4) to D(0, 7) are obtained, and at the same time, the noise signals are obtained from the sensing electrodes adjacent to the second row region. As an example, here the sensing electrodes adjacent to the second row region are the sensing electrode P(0, 8) located at the right position of the second row region and the sensing electrode P(1, 5) located at the lower position of the second row region, the corresponding noise signals are Dn(0, 8) and Dn(1, 5).

In the third scanning sub-period, the sensing electrodes P(0, 8) to P(0, 11) in the third row region are scanned and the detection signals D(0, 8) to D(0, 11) are obtained, and at the same time, the noise signals are obtained from the sensing electrodes adjacent to the third row region. As an example, here the sensing electrode adjacent to the third row region is the sensing electrode P(1, 9) located at the lower position of the third row region, the corresponding noise signal is Dn(1, 9).

At a second scanning period, scanning signals are provided to three row regions in a second row to obtain the detection signals. The second scanning period includes a fourth scanning sub-period to a sixth scanning sub-period.

In the fourth scanning sub-period, the sensing electrodes P(1, 0) to P(1, 3) in the fourth row region are scanned and the detection signals D(1, 0) to D(1, 3) are obtained, and at the same time, the noise signals are obtained from the sensing electrodes adjacent to the fourth row region. As an example, here the sensing electrodes adjacent to the fourth row region are the sensing electrode P(1, 4) located at the right position of the fourth row region and the sensing electrode P(2, 1) located at the lower position of the first row region, the corresponding noise signals are Dn(1, 4) and Dn(2, 1).

In the fifth scanning sub-period, the sensing electrodes P(1, 4) to P(1, 7) in the fifth row region are scanned and the detection signals D(1, 4) to D(1, 7) are obtained, and at the same time, the noise signals are obtained from the sensing electrodes adjacent to the fifth row region. As an example, here the sensing electrodes adjacent to the fifth row region are the sensing electrode P(1, 8) located at the right position of the fifth row region and the sensing electrode P(2, 5) located at the lower position of the fifth row region, the corresponding noise signals are Dn(1, 8) and Dn(2, 5).

In the sixth scanning sub-period, the sensing electrodes P(1, 8) to P(1, 11) in the sixth row region are scanned and the detection signals D(1, 8) to D(1, 11) are obtained, and at the same time, the noise signals are obtained from the sensing electrodes adjacent to the sixth row region. As an example, here the sensing electrode adjacent to the sixth row region is the sensing electrode P(2, 9) located at the lower position of the sixth row region, the corresponding noise signal is Dn(2, 9).

By this way, the whole array is scanned, and then the detection signals are adjusted by using the noise signals.

The sensing electrode P(0, 4) is scanned repeatedly during the first scanning sub-period and the second scanning sub-period of the first scanning period, so that the noise difference $\Delta D(0, 4)$ between the second scanning sub-period and the first scanning sub-period is $Dn(0, 4)-D(0, 4)$, and the detection signals acquired during the second scanning sub-period are added to the noise difference $\Delta D(0, 4)$, respectively, to obtain the adjusted detection signals of the second scanning sub-period, that is, $D'(0, 4)=D(0, 4)+\Delta D(0, 4)$, $D'(0, 5)=D(0, 5)+\Delta D(0, 4)$, ..., $D'(0, 7)=D(0, 7)+\Delta D(0, 4)$.

To continue the adjustment of the detection signals, the noise signals acquired during the second scanning sub-period are also adjusted, that is, $Dn'(0, 8)=Dn(0, 8)+\Delta D(0, 8)$, $Dn'(1, 5)=Dn(1, 5)+\Delta D(0, 8)$.

The sensing electrode P(0, 8) is scanned repeatedly during the third scanning sub-period and the second scanning sub-period, so that the noise difference $\Delta D(0, 8)$ between the third scanning sub-period and the second scanning sub-period is $Dn'(0, 8)-D(0, 8)$, and the detection signals acquired during the third scanning sub-period are added to the noise difference $\Delta D(0, 8)$, respectively, to obtain the adjusted detection signals of the third scanning sub-period, that is, $D'(0, 8)=D(0, 8)+\Delta D(0, 8)$, $D'(0, 9)=D(0, 9)+\Delta D(0, 8)$, ..., $D'(0, 11)=D(0, 11)+\Delta D(0, 8)$.

To continue the adjustment of the detection signals, the noise signal acquired during the third scanning sub-period is also adjusted, that is, $Dn'(1, 9)=Dn(1, 9)+\Delta D(0, 8)$.

The sensing electrode P(1,1) is scanned repeatedly during the fourth scanning sub-period of the second scanning period and the first scanning period, so that the noise difference $\Delta D(1, 1)$ between the fourth scanning sub-period and the first scanning period is $Dn(1, 1)-D(1, 1)$, and the detection signals acquired during the fourth scanning sub-period are added to the noise difference $D(1, 1)$, respectively, to obtain the adjusted detection signals of the fourth scanning sub-period, that is, $D'(1, 0)=D(1, 0)+\Delta D(1, 1)$, $D'(1, 1)=D(1, 1)+\Delta D(1, 1)$, ..., $D'(1, 3)=D(1, 3)+\Delta D(1, 1)$.

To continue the adjustment of the detection signals, the noise signals acquired during the fourth scanning sub-period are also adjusted, that is, $Dn'(1, 4)=Dn(1, 4)+\Delta D(1, 1)$, $Dn'(2, 1)=Dn(2, 1)+\Delta D(1, 1)$.

There are two sensing electrodes which are scanned repeatedly during the fifth scanning sub-period and all of the preceding scanning sub-periods of the fifth scanning sub-period, and the detection signals of the fifth scanning sub-period can be adjusted corresponding to either of the two sensing electrodes.

The sensing electrode P(1, 7) is scanned repeatedly during the fifth scanning sub-period and the first scanning period, so that the noise difference $\Delta D(1, 7)$ between the fourth scanning sub-period and the first scanning period is $Dn'(1, 7)-D(1, 7)$, and the detection signals acquired during the fifth scanning sub-period are added to the noise difference $\Delta D(1, 7)$, respectively, to obtain the adjusted detection signals of the fifth scanning sub-period, that is, $D'(1, 4)=D(1, 4)+\Delta D(1, 7)$, $D'(1, 5)=D(1, 5)+\Delta D(1, 7)$, ..., $D'(1, 7)=D(1, 7)+\Delta D(1, 7)$.

Or, the sensing electrode P(1, 4) is scanned repeatedly during the fifth scanning sub-period and the fourth scanning sub-period, so that the noise difference ΔD(1, 4) between the fourth scanning sub-period and the first scanning period is Dn(1, 4)-D(1, 4), and the detection signals acquired during the fifth scanning sub-period are added to the noise difference ΔD(1, 4), respectively, to obtain the adjusted detection signals of the fifth scanning sub-period, that is, D'(1, 4)=D(1, 4)+ΔD(1, 4), D'(1, 5)=D(1, 5)+ΔD(1, 4), . . . , D'(1, 7)=D(1, 7)+ΔD(1, 4).

By repeating iterations, the adjusted detection signals of the whole array can be obtained.

The disclosure provides the detection method and the device used in the fingerprint identification system, wherein the array is divided into a plurality of regions, the detection signals are obtained region by region, the noise signals are obtained from at least one sensing electrode adjacent to at least of the plurality of regions and the detection signals are adjusted by using the obtained noise signals, so that, the quality of the acquired fingerprint images is improved and the problem that the image quality of the fingerprint identification system is deteriorated due to the common mode interference of the power supply is solved.

Although various embodiments of the present invention are described above, these embodiments neither present all details, nor imply that the present invention is limited to these embodiments. Obviously, many modifications and changes may be made in light of the teaching of the above embodiments. These embodiments are presented and some details are described herein only for explaining the principle of the invention and its actual use, so that one skilled person can practice the present invention and introduce some modifications in light of the invention. Accordingly, the protection scope of the invention is only defined by attached claims.

The invention claimed is:

1. A detection method used in a fingerprint identification system which comprises an array composed of a plurality of sensing electrodes configured to obtain a detection signals of a fingerprint, comprising:
   dividing the array into a plurality of regions;
   obtaining the detection signals scanning the plurality of regions one by one;
   obtaining a noise signal from at least one selected sensing electrode of the plurality of sensing electrodes when one of the plurality of regions is being scanned, wherein said at least one selected sensing electrode is adjacent to said one of the plurality of regions; and
   adjusting at least one of the detection signals by using a noise difference between said noise signal and a corresponding one of the detection signals,
   wherein said corresponding one of the detection signals and said noise signal for generating said noise difference are obtained from a same one of said plurality of sensing electrodes.

2. The detection method according to claim 1, wherein the array is divided by row, by column or by block to obtain the plurality of regions.

3. The detection method according to claim 1, further comprising:
   providing scanning signals region by region during a plurality of scanning periods.

4. The detection method according to claim 3, wherein each one of the plurality of scanning periods comprises a plurality of scanning sub-periods, at least one region of the plurality of regions is scanned during each of the plurality of scanning sub-periods.

5. The detection method according to claim 4, wherein, when the detection signals are adjusted during a current scanning sub-period, the noise signal is from a previous scanning sub-period of the current scanning sub-period, or from a next scanning sub-period of the current scanning sub-period, or from a previous scanning period.

6. The detection method according to claim 4, wherein, said noise signal obtained in one of the plurality of scanning sub-periods is adjusted by using said noise signal obtained in another one of the plurality of scanning sub-periods.

7. The detection method according to claim 1, wherein, said at least one selected sensing electrode adjacent to said one of the plurality of regions comprises at least one of the plurality of sensing electrodes which is located at any position adjacent to said one of the plurality of regions.

8. A detection device used in a fingerprint identification system which comprises an array composed of a plurality of sensing electrodes configured to obtain detection signals of a fingerprint, comprising:
   a first module configured to obtain the detection signals, wherein the array is divided into a plurality of regions and said first module is configured to obtain said detection signals by scanning said plurality of regions one by one;
   a second module configured to obtain a noise signal from at least one selected sensing electrode of the plurality of sensing electrodes when one of the plurality of regions is being scanned, wherein said at least one selected sensing electrode is adjacent to said one of the plurality of regions; and
   a third module configured to adjust at least one of the detection signals by using a noise difference between said noise signal and a corresponding one of the detection signals,
   wherein said one of the detection signals and said noise signal are obtained from a same one of said at least one selected sensing electrode, both of said first module and said second module comprise at least one analog-to-digital converters, said third module is connected to said at least one analog-to-digital converters for receiving said noise signal and said detection signals.

9. The detection device according to claim 8, wherein the array is divided by row, by column or by block to obtain the plurality of regions.

10. The detection device according to claim 9, said first module is configured to provide scanning signals region by region during a plurality of scanning periods.

11. The detection device according to claim 10, wherein each of the plurality of scanning periods comprises a plurality of scanning sub-periods, and at least one region of the plurality of regions is scanned during each scanning sub-period.

12. The detection device according to claim 11, wherein, when the detection signals are adjusted during a current scanning sub-period, the noise signal is from a previous scanning sub-period of the current scanning sub-period, or from a next scanning sub-period of the current scanning sub-period, or from a previous scanning period.

13. The detection device according to claim 8, wherein, said at least one selected sensing electrode adjacent to said one of the plurality of regions comprises at least one of the plurality of sensing electrodes which is located at any position adjacent to said one of the plurality of regions.

* * * * *

UNITED STATES PATENT AND TRADEMARK OFFICE
CERTIFICATE OF CORRECTION

| | | |
|---|---|---|
| PATENT NO. | : 10,565,423 B2 | |
| APPLICATION NO. | : 15/877014 | |
| DATED | : February 18, 2020 | |
| INVENTOR(S) | : Zhimin Tian and Changhai Wang | |

It is certified that error appears in the above-identified patent and that said Letters Patent is hereby corrected as shown below:

On the Title Page

Item [73], insert --Chipone Technology Beijing Co., LTD.--

Signed and Sealed this
Twenty-ninth Day of August, 2023

Katherine Kelly Vidal
*Director of the United States Patent and Trademark Office*